(12) United States Patent
Hayama et al.

(10) Patent No.: US 11,242,940 B2
(45) Date of Patent: Feb. 8, 2022

(54) CAPACITY CONTROL VALVE

(71) Applicant: Eagle Industry Co., Ltd., Tokyo (JP)

(72) Inventors: Masahiro Hayama, Tokyo (JP);
Yoshihiro Ogawa, Tokyo (JP); Keigo Shirafuji, Tokyo (JP); Kohei Fukudome, Tokyo (JP); Wataru Takahashi, Tokyo (JP)

(73) Assignee: EAGLE INDUSTRY CO., LTD.

( * ) Notice: Subject to any disclaimer, the term of this patent is extended or adjusted under 35 U.S.C. 154(b) by 0 days.

(21) Appl. No.: 16/772,703

(22) PCT Filed: Dec. 26, 2018

(86) PCT No.: PCT/JP2018/047716
§ 371 (c)(1),
(2) Date: Jun. 12, 2020

(87) PCT Pub. No.: WO2019/131703
PCT Pub. Date: Jul. 4, 2019

(65) Prior Publication Data
US 2021/0180715 A1    Jun. 17, 2021

(30) Foreign Application Priority Data
Dec. 27, 2017   (JP) .............................. JP2017-252152

(51) Int. Cl.
*F16K 31/12*  (2006.01)
*F16K 31/06*  (2006.01)
(Continued)

(52) U.S. Cl.
CPC ...... *F16K 31/1223* (2013.01); *F16K 31/0613* (2013.01); *F04B 27/18* (2013.01)

(58) Field of Classification Search
CPC .. F16K 31/1223; F16K 31/0613; F16K 31/06; F16K 31/0624; F04B 27/18;
(Continued)

(56) References Cited

U.S. PATENT DOCUMENTS

| 9,581,149 B2 | 2/2017 | Ota et al. ............ F04B 27/1804 |
| 9,581,150 B2 | 2/2017 | Ota et al. ............ F04B 27/1804 |

(Continued)

FOREIGN PATENT DOCUMENTS

| EP | 2 594 794 | 5/2013 | .............. F04B 27/18 |
| JP | 2014-194180 | 10/2014 | .............. F04B 27/14 |

(Continued)

OTHER PUBLICATIONS

International Preliminary Report on Patentability issued in PCT/JP2018/047716, dated Jun. 30, 2020, 8 pages.
(Continued)

*Primary Examiner* — Kelsey E Cary
(74) *Attorney, Agent, or Firm* — Hayes Soloway P.C.

(57) ABSTRACT

A capacity control valve includes a valve housing provided with a main valve seat; a main valve body that is inserted into the valve housing and includes a main valve portion which is capable of seating on the main valve seat 10a to open and close a communication between a suction port and a control port using a driving force of a solenoid; and a pressure-sensitive body that applies a biasing force to the main valve body in an opening direction according to pressure of a fluid surrounding the pressure-sensitive body. The fluid is supplied from the control port to around the pressure-sensitive body, and the fluid is supplied from the suction port to a back pressure side of the main valve body.

8 Claims, 8 Drawing Sheets

(51) Int. Cl.
  *F04B 27/18* (2006.01)
  *F16K 31/122* (2006.01)
(58) Field of Classification Search
  CPC .......... F04B 27/1804; F04B 2027/1813; F04B 2027/1822; F04B 2027/1854; F04B 2027/1809–1895
  See application file for complete search history.

(56) References Cited

U.S. PATENT DOCUMENTS

| | | | | |
|---|---|---|---|---|
| 2008/0138213 | A1* | 6/2008 | Umemura | F04B 27/1804 417/222.2 |
| 2009/0108221 | A1* | 4/2009 | Umemura | F04B 27/1804 251/129.15 |
| 2009/0183786 | A1* | 7/2009 | Iwa | F04B 27/1804 137/487.5 |
| 2012/0198992 | A1* | 8/2012 | Futakuchi | F04B 27/1804 91/505 |
| 2012/0198993 | A1* | 8/2012 | Fukudome | F04B 27/1804 91/505 |
| 2013/0291963 | A1* | 11/2013 | Futakuchi | F04B 27/1804 137/487.5 |
| 2014/0099214 | A1* | 4/2014 | Fukudome | F04B 27/1804 417/222.2 |
| 2014/0294632 | A1 | 10/2014 | Kondo et al. | 417/434 |
| 2014/0369862 | A1 | 12/2014 | Ota et al. | F04B 27/1804 |
| 2015/0044067 | A1 | 2/2015 | Ota et al. | F04B 27/1804 |
| 2015/0068628 | A1* | 3/2015 | Iwa | F16K 31/0613 137/625.65 |
| 2015/0104334 | A1 | 4/2015 | Ota et al. | F04B 27/1804 |
| 2015/0345655 | A1* | 12/2015 | Higashidozono | F04B 27/1804 137/624.27 |

FOREIGN PATENT DOCUMENTS

| | | | |
|---|---|---|---|
| JP | 2015-75054 | 4/2015 | ............ F04B 27/14 |
| JP | 2015-137546 | 7/2015 | ............ F04B 27/14 |
| JP | 5983539 | 8/2016 | ............ F04B 27/18 |
| JP | 6135521 | 5/2017 | ............ F04B 27/18 |

OTHER PUBLICATIONS

International Search Report and Written Opinion issued in PCT/JP2018/047716, dated Mar. 26, 2019, with English translation, 14 pages.
The First Office Action issued in Chinese Patent Appln. Serial No. 201880081296.0, dated Jul. 5, 2021, with English translation, 9 pages.
Extended European Search Report issued in European Patent Appln. Serial No. 18896700.4, dated Aug. 12, 2021, 8 pages.

* cited by examiner

CAPACITY CONTROL VALVE

TECHNICAL FIELD

The present invention relates to a displacement control valve that variably controls the capacity or pressure of a working fluid, for example, to a capacity control valve that controls the discharge amount of a variable displacement compressor used in an air conditioning system of a vehicle, according to the pressure of a working fluid.

BACKGROUND ART

A variable displacement compressor used in an air conditioning system of a vehicle or the like includes a rotary shaft which is driven and rotated by an engine; a swash plate which is coupled to the rotary shaft via a moving body capable of moving along the rotary shaft in an axial direction in a crankcase such that the inclined angle of the swash plate is variable; a piston for compression coupled to the swash plate; and the like. The variable displacement compressor changes the stroke amount of the piston by changing the inclined angle of the swash plate and thus to control the discharge amount of a fluid. The inclined angle of the swash plate can be continuously changed by appropriately controlling the pressure in a control chamber while using a capacity control valve that is opened and closed by an electromagnetic force, and using a suction pressure Ps of a suction chamber that communicates with the crankcase to suction the fluid, a discharge pressure Pd of a discharge chamber that discharges the fluid pressurized by the piston, and a control pressure Pc of the control chamber that communicates with a pressure adjustment chamber and is defined between the moving body and a fixed body.

Figure 7:
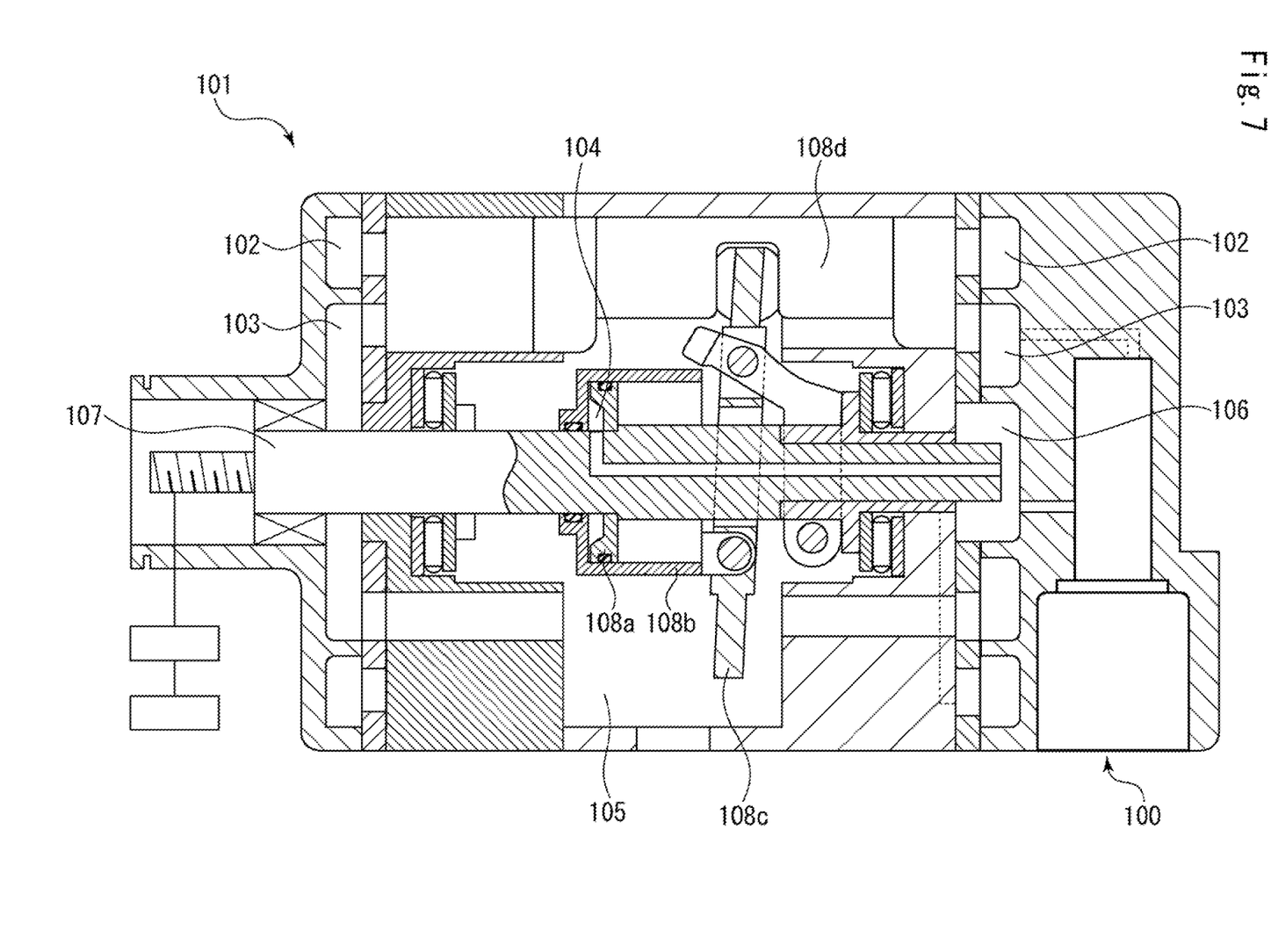
FIG. 7 is a schematic configuration view illustrating a swash plate-type variable displacement compressor including a capacity control valve of Patent Citation 1 in the related art.
Figure 8:
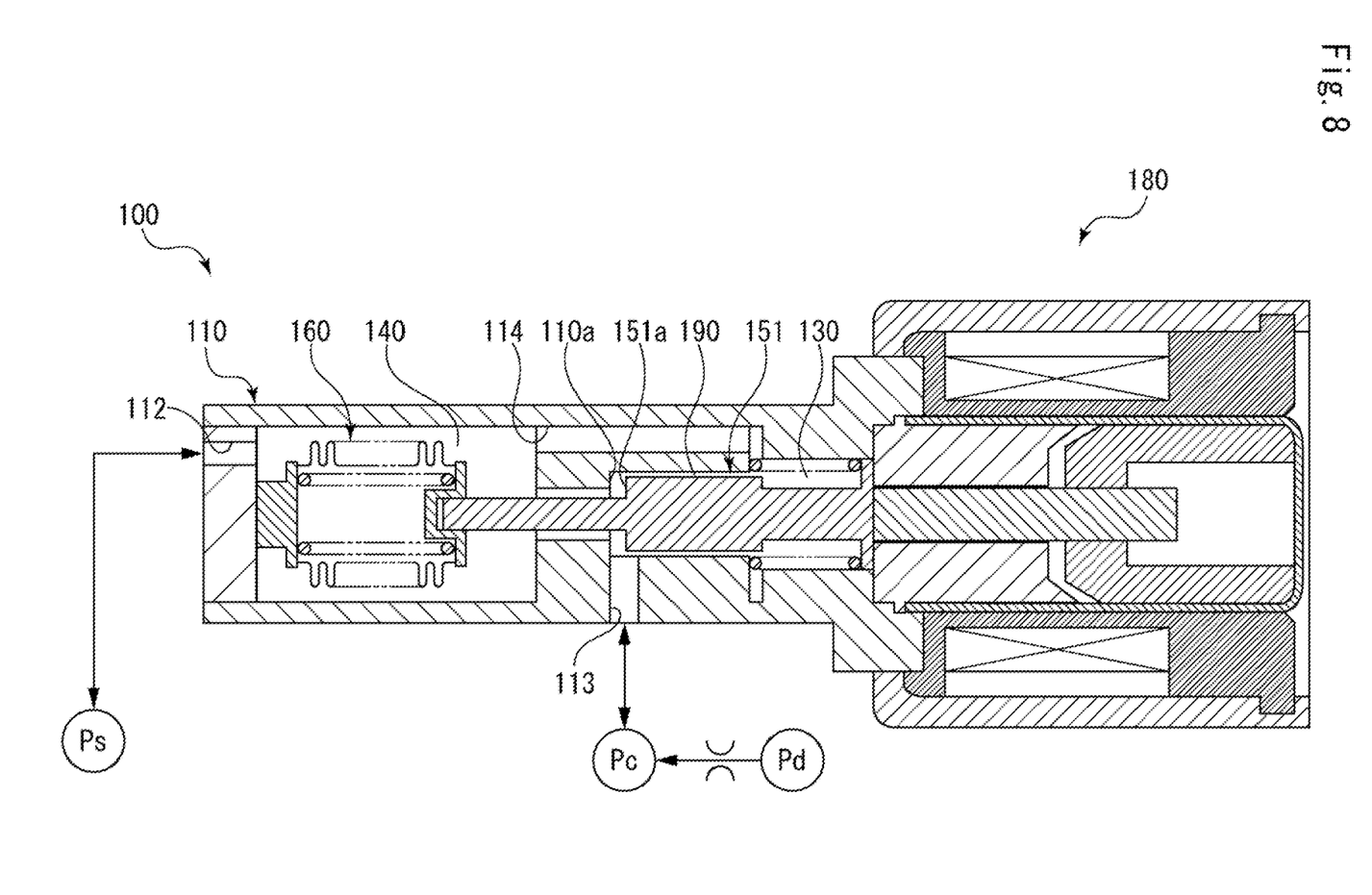
FIG. 8 is a cross-sectional view illustrating a mode where a main valve is opened when the capacity control valve of Patent Citation 1 in the related art is in a de-energizing state.

As illustrated in FIGS. 7 and 8, a capacity control valve 100 disclosed in Patent Citation 1 mainly includes a valve housing 110; a main valve body 151 that is inserted into the valve housing 110 and includes a main valve portion 151a which is capable of seating on a main valve seat 110a to open and close a communication between a suction chamber 103 and a control chamber 104 of a variable displacement compressor 101 using the driving force of an electromagnetic solenoid 180; and a pressure-sensitive body 160 that applies a biasing force to the main valve body 151 in an opening direction according to a surrounding fluid pressure. A fluid of the suction chamber 103 is supplied from a communication passage 112 to a pressure-sensitive chamber 140 in which the pressure-sensitive body 160 is provided, and a fluid of the control chamber 104 is supplied from a communication passage 113 to around the main valve body 151. In addition, in the valve housing 110, a back pressure chamber 130 provided on a back pressure side of the main valve body 151 communicates with the pressure-sensitive chamber 140 in which the pressure-sensitive body 160 is provided, through a communication passage 114 penetrating through the valve housing 110 in an axial direction.

During the continuous driving of the variable displacement compressor 101 (hereinafter, may be simply referred to as "during the continuous driving"), the capacity control valve 100 performs normal control where the electromagnetic solenoid 180 is duty-controlled by a control computer, and the main valve body 151 is driven in the axial direction by an electromagnetic force generated by the electromagnetic solenoid 180 to open and close a main valve; and thereby, the communication state between the suction chamber 103 and the control chamber 104 is changed, and thus the control pressure Pc is adjusted.

In the normal control of the capacity control valve 100, since the difference in internal pressure between the control chamber 104 (or a pressure adjustment chamber 106) and the suction chamber 103 (or a crankcase 105) in the variable displacement compressor 101 is appropriately controlled, and a moving body 108b moves in the axial direction relative to a fixed body 108a which partitions the control chamber 104, to continuously change the inclined angle of a swash plate 108c with respect to a rotary shaft 107, the stroke amount of a piston 108d is changed; and thereby, the discharge amount of the fluid for a discharge chamber 102 is controlled, and thus the cooling capacity of the air conditioning system is adjusted to a desired cooling capacity.

CITATION LIST

{Patent Literature}
Patent Citation 1: JP 5983539 B2 (Page 3, FIG. 1 and FIG. 3)

SUMMARY OF INVENTION

Technical Problem

However, in Patent Citation 1, since the capacity control valve 100 has a structure where the back pressure chamber 130 and the pressure-sensitive chamber 140 communicate with each other through the communication passage 114 in the normal control of the capacity control valve 100, in a state where the main valve is closed, the fluid of the control chamber 104 which is supplied from the communication passage 113 to around the main valve body 151 easily flows into the back pressure chamber 130 through a gap portion 190 between an inner periphery of the valve housing 110 and an outer periphery of the main valve body 151. For this reason, even in the state where the main valve is closed, since the leakage of the fluid from a side of the control chamber 104 toward a side of the suction chamber 103 is large and the communication between the suction chamber 103 and the control chamber 104 is insufficiently closed by the capacity control valve 100, the control range of the control pressure Pc by the capacity control valve 100 becomes narrow, which is a problem.

The present invention has been made in light of the foregoing problem, and an object of the present invention is to provide a capacity control valve having a small leakage of a fluid and a wide control range of the fluid.

Solution to Problem

In order to solve the foregoing problem, a capacity control valve according to the present invention includes a valve housing provided with a main valve seat; a main valve body that is inserted into the valve housing and includes a main valve portion which is capable of seating on the main valve seat to open and close a communication between a suction port through which a suction fluid with a suction pressure passes and a control port through which a control fluid with a control pressure passes, using a driving force of a solenoid; and a pressure-sensitive body that applies a biasing force to the main valve body in an opening direction according to pressure of a fluid surrounding the pressure-sensitive body, in which the fluid is supplied from the control port to around the pressure-sensitive body, and the fluid is supplied from the suction port to a back pressure side of the main valve body. According to this configuration, in normal control state where a main valve is closed, since the main valve portion of the main valve body is seated on the main valve seat and the fluid from the suction port is supplied to a gap portion between an inner periphery of the valve housing into which the main valve body is inserted and an outer periphery of the main valve body, a leakage of the fluid from a side of the control port toward a side of the suction port is small, and it is possible to widen the control range of the control pressure by the capacity control valve.

Preferably, the fluid from the suction port may be supplied to the back pressure side of the main valve body through the gap portion between the inner periphery of the valve housing and the outer periphery of the main valve body. According to this configuration, since the fluid from the suction port is supplied to the back pressure side of the main valve body through the gap portion between the inner periphery of the valve housing and the outer periphery of the main valve body, it is possible to simplify the structure of the capacity control valve.

Preferably, the main valve body may be provided with a pressure-sensitive valve body that is capable of seating on a pressure-sensitive valve seat formed on the pressure-sensitive body, and the main valve body and the pressure-sensitive valve body cooperatively may have a hollow hole which extends in an axial direction thereof and which communicates with the back pressure side of the main valve body. According to this configuration, when the suction pressure is high, since the pressure-sensitive body contracts due to the surrounding fluid pressure and the pressure-sensitive valve is opened, the control pressure can be rapidly released from the hollow hole of the main valve body and the pressure-sensitive valve body toward the back pressure side of the main valve body.

Preferably, a recess portion having a larger diameter than that of the hollow hole of the main valve body may be formed in the pressure-sensitive body and positioned on an inner diameter side with respect to the pressure-sensitive valve seat. According to this configuration, since the suction pressure is applied in the axial direction of the main valve body and a force which is applied to the main valve body in the axial direction is substantially canceled out by the control pressure, the control accuracy of the capacity control valve is good.

Preferably, the main valve body may have a cylindrical shape, the pressure-sensitive valve body is connected and fixed to a first end of the main valve body, a rod is connected and fixed to a second end of the main valve body, and a through-hole extending in a radial direction may be formed in the main valve body on a side of the pressure-sensitive valve body with respect to the rod. According to this configuration, since it is possible to widen the flow path cross-sectional area of the gap portion between the inner periphery of the valve housing and the outer periphery of the main valve body, and the pressure-sensitive valve is opened, the control pressure can be rapidly released from the hollow hole of the main valve body and the pressure-sensitive valve body toward the back pressure side of the main valve body through the through-hole of the main valve body.

DESCRIPTION OF EMBODIMENTS

Modes for implementing a capacity control valve according to the present invention will be described below based on embodiments.

First Embodiment

A capacity control valve according to the first embodiment of the present invention will be described with reference to FIGS. 1 to 3. Hereinafter, a description will be given based on the assumption that right and left sides on FIG. 1 as viewed from a front side are right and left sides of the capacity control valve.

A capacity control valve V of the present invention is assembled into a variable displacement compressor which is used in an air conditioning system of a vehicle or the like, and variably controls the pressure of a working fluid (hereinafter, simply referred to as a "fluid") which is a refrigerant, to control the discharge amount of the fluid for a discharge chamber of the variable displacement compressor and adjust the cooling capacity of the air conditioning system to a desired cooling capacity. Incidentally, a variable displacement compressor with a configuration illustrated in FIG. 7 can be used as the variable displacement compressor; however, the following description will be given without using reference signs in FIG. 7.

Figure 1:
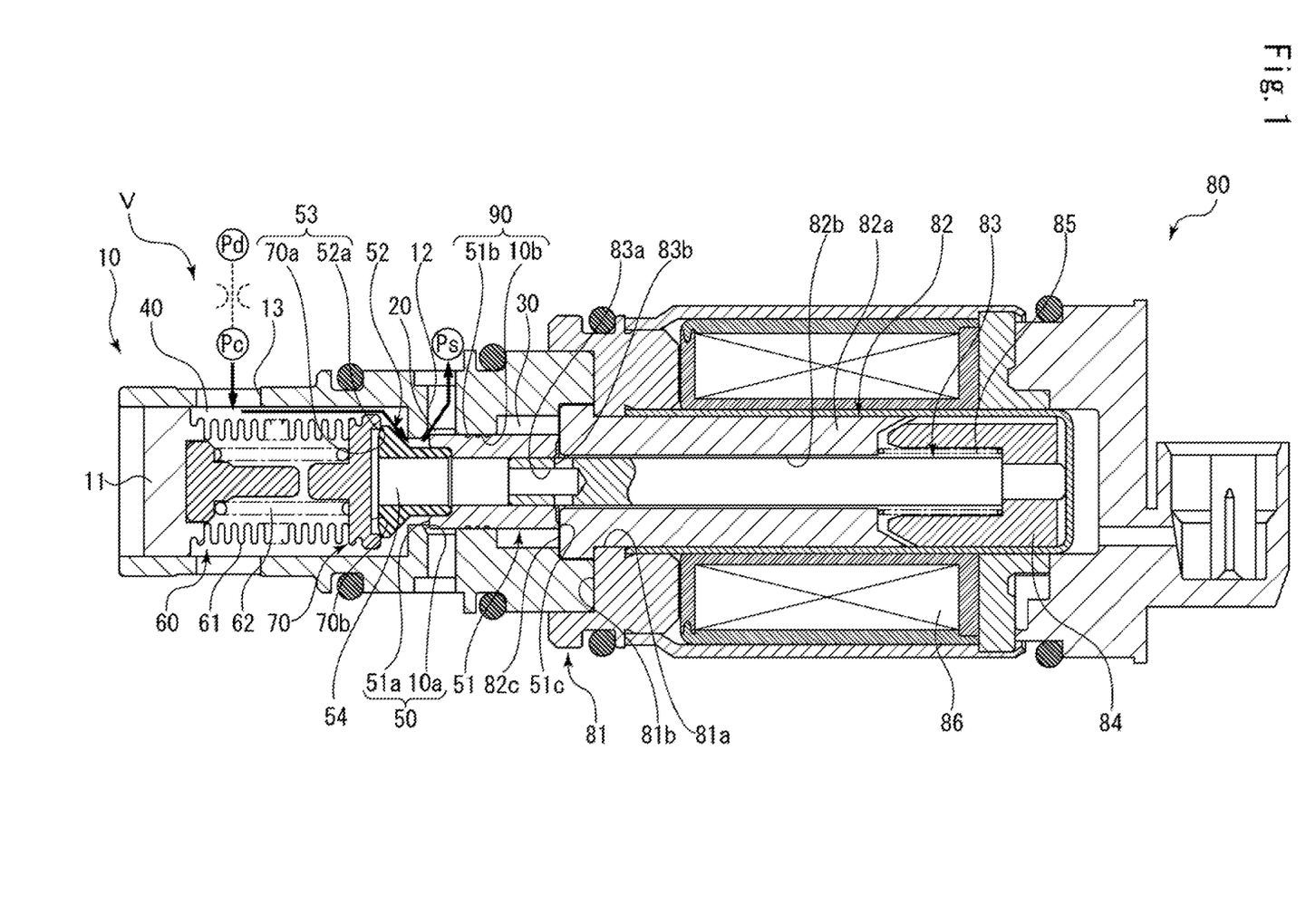
FIG. 1 is a cross-sectional view illustrating a mode where a main valve is opened when a capacity control valve according to a first embodiment of the present invention is in a de-energizing state.
Figure 2:
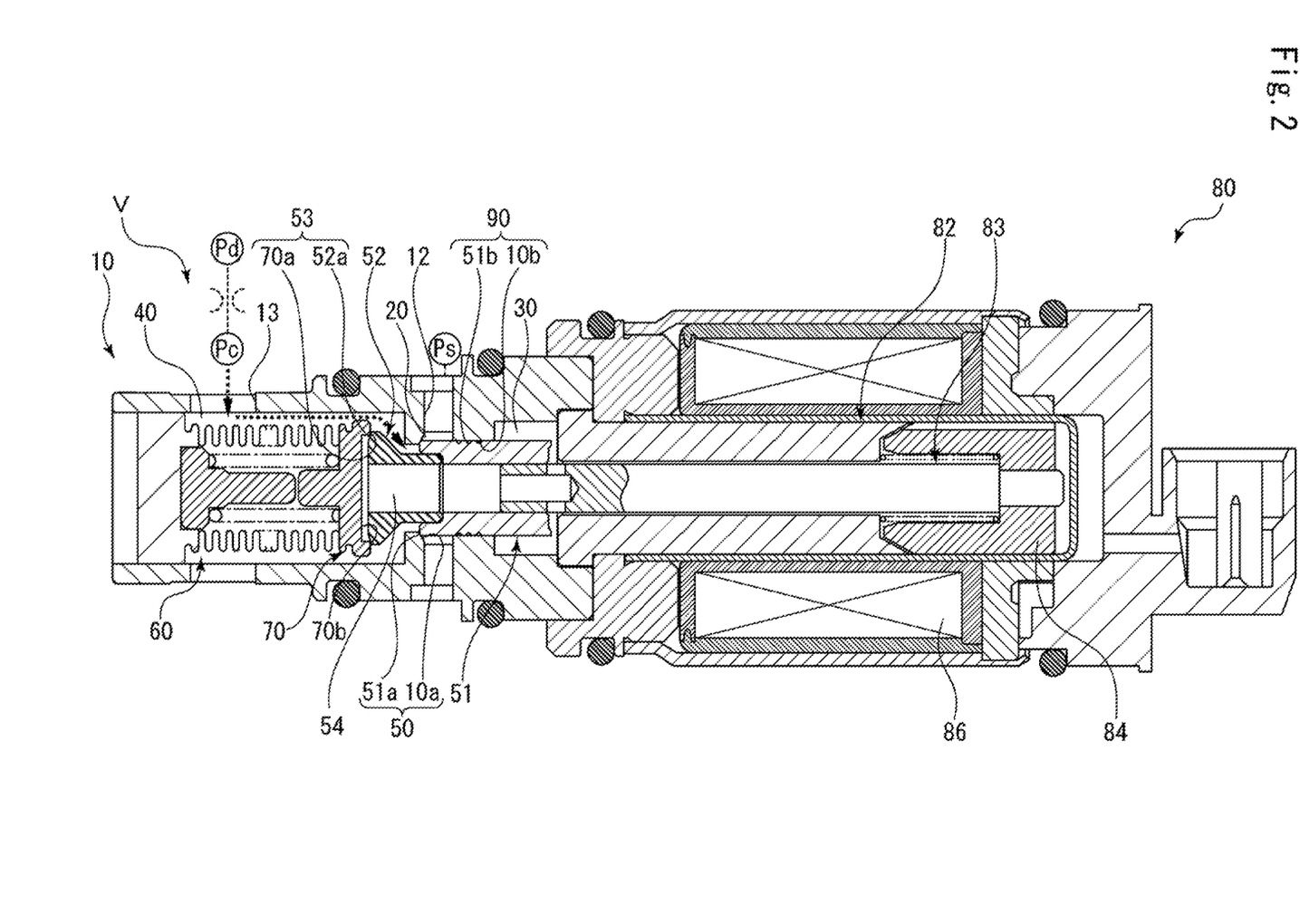
FIG. 2 is a cross-sectional view illustrating a mode where the main valve is closed when the capacity control valve according to the first embodiment is in an energizing state.
Figure 3:
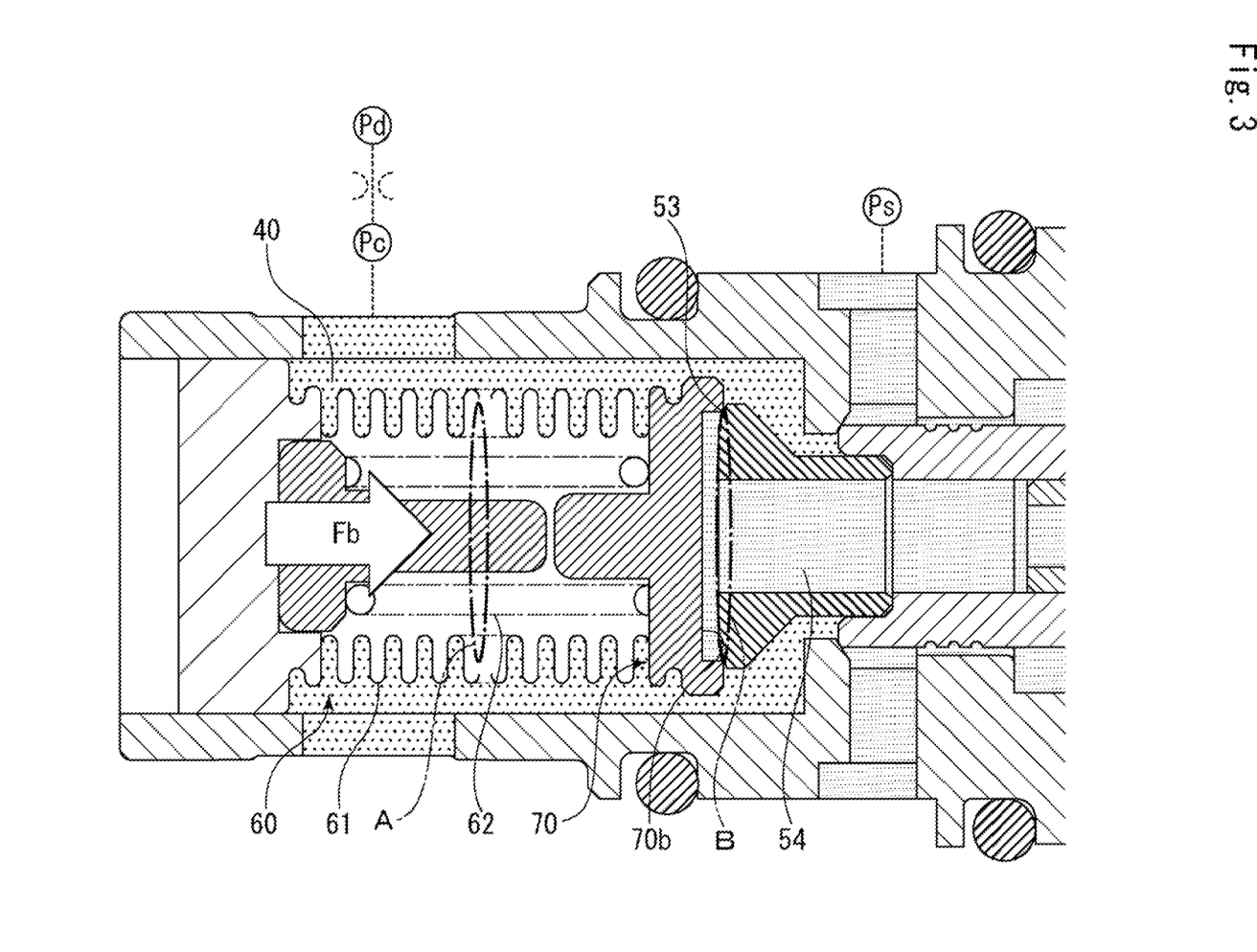
FIG. 3 is a cross-sectional view illustrating the configuration of a pressure-sensitive valve in the capacity control valve according to the first embodiment.

In detail, the capacity control valve V controls the opening and closing of a main valve 50 in the capacity control valve V by adjusting a current with which a coil 86 forming a solenoid 80 is energized, and controls the fluid flowing into a control chamber of the variable displacement compressor or the fluid flowing out from the control chamber by controlling the opening and closing of a pressure-sensitive valve 53 using a surrounding fluid pressure; and thereby, the capacity control valve V variably controls a control pressure Pc in the control chamber (refer to FIGS. 1 and 2). Incidentally, in this example, the main valve 50 includes a main valve body 51 and a main valve seat 10a that is formed on an inner peripheral surface of a valve housing 10. A main valve portion 51a which is formed at a left axial end of the main valve body 51 is capable of seating on the main valve seat 10a.

Firstly, the structure of the capacity control valve V will be described. As illustrated in FIG. 1, the capacity control valve V mainly includes the valve housing 10 made of a metallic material or a resin material; the main valve body 51 that is inserted into the valve housing 10 to be able to reciprocate in the axial direction; a pressure-sensitive valve body 52; a pressure-sensitive body 60 that applies a biasing force to the main valve body 51 and the pressure-sensitive valve body 52 toward right in the axial direction according to pressure of the fluid surrounding the pressure sensitive body 60; and the solenoid 80 that exerts a driving force on the main valve body 51 and the pressure-sensitive valve body 52 connected to the valve housing 10.

As illustrated in FIG. 1, the solenoid 80 mainly includes a casing 81 including an opening portion 81a that is open toward left in the axial direction; a fixed core 82 having a substantially cylindrical shape which is inserted through the opening portion 81a of the casing 81 from left in the axial direction and is fixed to an inner diameter side of the casing 81; a drive rod 83 that is a rod which is able to reciprocate in the axial direction on an inner diameter side of the fixed core 82 and of which the left axial end portion is connected and fixed to the main valve body 51; a movable core 84 that is fastened to a right axial end portion of the drive rod 83; a coil spring 85 that is provided between the fixed core 82 and the movable core 84 to bias the movable core 84 toward right in the axial direction; and the coil 86 for excitation that is wound on an outer side of the fixed core 82 with a bobbin interposed therebetween.

A recess portion 81b which is recessed from a radial center of a left axial end of the casing 81 toward right in the axial direction is formed in the casing 81. A right axial end portion of the valve housing 10 is inserted into and fixed to the recess portion 81b.

The fixed core 82 is formed from a rigid body that is made of a magnetic material such as iron or silicon steel, and includes a cylindrical portion 82a where an insertion hole 82b into which the drive rod 83 extending in the axial direction is inserted is formed.

A communication hole 83a which is drilled from a radial center of a left axial end of the drive rod 83 toward right in the axial direction is formed in the drive rod 83. A through-hole 83b extending in a radial direction is formed in a right axial end portion of the communication hole 83a. The communication hole 83a communicates with the through-hole 83b. Incidentally, a plurality of the through-holes 83b may be formed.

As illustrated in FIG. 1, an adjusting partition member 11 is press-fitted in a left axial end portion of the valve housing 10, so that the valve housing 10 has a substantially cylindrical shape with a bottom. The main valve body 51 and the pressure-sensitive valve body 52 are disposed inside the valve housing 10 to be able to reciprocate in the axial direction. A guide surface 10b having a small diameter with which an outer peripheral surface 51b of the main valve body 51 is in slidable contact is formed in a part of the inner peripheral surface of the valve housing 10. Incidentally, a gap portion 90 is formed between the outer peripheral surface 51b of the main valve body 51 and the guide surface 10b of the valve housing 10, so that the outer peripheral surface 51b and the guide surface 10b are slightly separated from each other in the radial direction. The main valve body 51 receives the driving force of the solenoid 80 (through the drive rod 83) to be able to move smoothly while being guided in the axial direction.

In addition, a main valve chamber 20 in which a main valve portion 51a side of the main valve body 51 is disposed, a back pressure chamber 30 which is formed on a right axial side which is a back pressure side of the main valve body 51, and a pressure-sensitive chamber 40 which is formed at a position that is opposite to the back pressure chamber 30 with respect to the main valve chamber 20 are formed inside the valve housing 10. Incidentally, the back pressure chamber 30 is defined by an opening end surface 82c of the fixed core 82, the outer peripheral surface 51b on the back pressure side of the main valve body 51, and the inner peripheral surface of the valve housing 10 which is positioned closer to the right side in the axial direction than the guide surface 10b. The back pressure chamber 30 communicates with the main valve chamber 20 via the gap portion 90.

In addition, a communication passage 12 that is a suction port through which the main valve chamber 20 communicates with a suction chamber of the variable displacement compressor, and a communication passage 13 that is a control port through which the pressure-sensitive chamber 40 communicates with the control chamber of the variable displacement compressor are formed in the valve housing 10. Accordingly, a fluid of the suction chamber (namely, a suction pressure Ps which is a fluid pressure of the suction chamber) is supplied to the main valve chamber 20 through the communication passage 12, and a fluid of the control chamber (namely, the control pressure Pc which is a fluid pressure of the control chamber) is supplied to the pressure-sensitive chamber 40 through the communication passage 13. Incidentally, since the back pressure chamber 30 communicates with the main valve chamber 20 via the gap portion 90, the fluid of the main valve chamber 20 as the suction chamber (namely, the suction pressure Ps which is the fluid pressure of the suction chamber) is supplied to the back pressure chamber 30 through the gap portion 90.

As illustrated in FIG. 1, the main valve body 51 has a substantially cylindrical shape. The pressure-sensitive valve body 52 having a substantially cylindrical shape and a substantially turret shape in a side view is connected and fixed to a left axial end portion of the main valve body 51 which is one end of the main valve body 51, and the drive rod 83 is connected and fixed to a right axial end portion which is the other end. The main valve body 51, the pressure-sensitive valve body 52, and the drive rod 83 move integrally in the axial direction. In addition, a hollow hole connects the insides of the main valve body 51 and the pressure-sensitive valve body 52 to form an intermediate communication passage 54 that penetrates therethrough over the axial direction. Incidentally, a right axial side of the intermediate communication passage 54 communicates with the back pressure chamber 30 via the communication hole 83a and the through-hole 83b which are formed in the left axial end portion of the drive rod 83.

Since the intermediate communication passage 54 is connected to the back pressure chamber 30 as described above, in normal control illustrated in FIG. 2, the fluid of the back pressure chamber 30 (namely, the suction pressure Ps which is a fluid pressure of the back pressure chamber 30) is supplied to a recess portion 70b of an adapter 70 to be described later through the communication hole 83a and the through-hole 83b of the drive rod 83.

In addition, when the capacity control valve V is in a de-energizing state, the main valve portion 51a of the main valve body 51 separates from the main valve seat 10a of the valve housing 10 so that the main valve 50 is opened, and a back pressure side end portion 51c on the right axial side of the main valve body 51 is configured to come into contact with the opening end surface 82c of the fixed core 82 (refer to FIG. 1). Incidentally, a valve structure where the back pressure side end portion 51c of the main valve body 51 serves as a valve portion and the opening end surface 82c of the fixed core 82 serves as a valve seat to close the communication state between the intermediate communication passage 54, the communication hole 83a, the through-hole 83b, and the back pressure chamber 30 may be adopted.

As illustrated in FIG. 1, the pressure-sensitive body 60 mainly includes a bellows core 61 in which a coil spring 62 is built, and the adapter 70 which is formed in a right axial end portion of the bellows core 61. A left axial end of the bellows core 61 is fixed to the adjusting partition member 11. Incidentally, the bellows core 61 of the pressure-sensitive body 60 is made of a material having a high yield stress (for example, stainless steel).

In addition, the pressure-sensitive body 60 is disposed in the pressure-sensitive chamber 40. A pressure-sensitive valve portion 52a of the pressure-sensitive valve body 52 is seated on a valve seat 70a which is a pressure-sensitive valve seat of the adapter 70 by the biasing forces of the coil spring 62 and the bellows core 61. In addition, the recess portion 70b having a larger diameter than that of the intermediate communication passage 54 that is a hollow hole inside the main valve body 51 and the pressure-sensitive valve body 52 is formed closer to an inner diameter side in the adapter 70 than the valve seat 70a. Incidentally, the suction pressure Ps which is supplied from the back pressure chamber 30 to the intermediate communication passage 54 is applied to the recess portion 70b.

Incidentally, when the suction pressure Ps in the back pressure chamber 30 (or the intermediate communication passage 54) is high, the pressure-sensitive body 60 contracts and operates to cause the valve seat 70a of the adapter 70 to separate from the pressure-sensitive valve portion 52a of the pressure-sensitive valve body 52, so that the pressure-sensitive valve 53 is opened; however, the illustration is omitted for convenience of description. In detail, as illustrated in FIG. 3, when Fb denotes the biasing force of the coil spring 62 which biases the adapter 70 of the pressure-sensitive body 60 toward right in the axial direction, A denotes the effective area of the bellows core 61 which receives the control pressure Pc in the pressure-sensitive chamber 40, and B denotes the effective area of the recess portion 70b of the adapter 70 which receives the suction pressure Ps through the intermediate communication passage 54, the balance of forces applied to the bellows core 61 of the pressure-sensitive body 60 is expressed by the following equation, and it is possible to randomly set a pressure to open the pressure-sensitive valve 53 by adjusting the effective area B of the recess portion 70b of the adapter 70.

$$Fb - B \cdot Ps - (A-B) \cdot Pc = 0 \quad \text{(Equation)}$$

Since the pressure-sensitive valve 53 is opened at the random set pressure as described above, the control pressure Pc which is high in the pressure-sensitive chamber 40 can be rapidly released toward the back pressure chamber 30, which is formed on the back pressure side of the main valve body 51, through the intermediate communication passage 54.

Subsequently, a change in the communication state between the suction chamber and the control chamber of the variable displacement compressor in the normal control of the capacity control valve V will be described in detail. As illustrated in FIG. 1, when the capacity control valve V is in the de-energizing state, since the movable core 84 is pressed toward right in the axial direction by the biasing force of the coil spring 85 forming the solenoid 80 or the biasing forces of the coil spring 62 and the bellows core 61, the drive rod 83, the main valve body 51, and the pressure-sensitive valve body 52 move toward right in the axial direction and the main valve portion 51a separates from the main valve seat 10a, so that the main valve 50 is opened and the pressure-sensitive chamber 40 and the main valve chamber 20 communicate with each other.

As described above, when the capacity control valve V is in the de-energizing state, since the main valve 50 is opened, the fluid in the control chamber of the variable displacement compressor is supplied to the pressure-sensitive chamber 40 through the communication passage 13 to pass through the main valve chamber 20 and then flow into the suction chamber through the communication passage 12 (as illustrated with the solid line arrows in FIG. 1). The reason is that the control pressure Pc is a higher pressure than the suction pressure Ps.

In the capacity control valve V, when the coil 86 of the solenoid 80 is energized from the de-energizing state illustrated in FIG. 1, the coil 86 is excited to generate an electromagnetic force, the movable core 84 is attracted toward the fixed core 82 receiving the electromagnetic force, the drive rod 83 of which the right axial end portion is coupled to the movable core 84 is driven, and the main valve body 51 coupled to the left axial end portion of the drive rod 83 moves toward left in the axial direction (refer to FIG. 2). In this case, the main valve body 51 and the pressure-sensitive valve body 52 move integrally toward left in the axial direction.

Accordingly, in the capacity control valve V, as illustrated in FIG. 2, the main valve portion 51a is seated on the main valve seat 10a, so that the main valve 50 is closed and the pressure-sensitive chamber 40 and the main valve chamber 20 do not communicate with each other.

As described above, when the capacity control valve V is in an energizing state, even though the fluid in the control chamber of the variable displacement compressor is supplied to the pressure-sensitive chamber 40 through the communication passage 13, since the main valve 50 is closed, the movement of the fluid toward a main valve chamber 20 side is blocked (as illustrated with the dotted line arrows in FIG. 2). In this case, the fluid of the suction chamber is supplied to the main valve chamber 20 through the communication passage 12.

Accordingly, when the capacity control valve V in this embodiment is in the normal control where the main valve 50 is closed, since the main valve portion 51a of the main valve body 51 is seated on the main valve seat 10a formed in the inner peripheral surface of the valve housing 10, and the fluid which is supplied from the suction chamber to the main valve chamber 20 through the communication passage 12 is supplied to the gap portion 90 between the guide surface 10b of the valve housing 10 into which the main valve body 51 is inserted and the outer peripheral surface 51b of the main valve body 51, there is almost no leakage from a control chamber side toward a suction chamber side; and thereby, it is possible to widen the control range of the control pressure Pc by the capacity control valve V, and it is possible to improve the responsiveness and the cooling efficiency of the air conditioning system by the capacity control valve V.

In addition, since the capacity control valve V has a structure where the fluid of the suction chamber is supplied to the back pressure chamber 30 which is formed on the back pressure side of the main valve body 51, in the normal control, the control pressure Pc has no influence on the main valve body 51. Furthermore, since a flow path through which the fluid of the suction chamber is supplied to the back pressure chamber 30 is formed by the gap portion 90, it is not necessary to separately provide a communication passage through which the main valve chamber 20 and the back pressure chamber 30 communicate with each other, and it is possible to simplify the structure of the capacity control valve V.

In addition, since the recess portion 70b having a larger diameter than that of the intermediate communication passage 54 is formed closer to the inner diameter side in the adapter 70 of the pressure-sensitive body 60 than the valve seat 70a, the suction pressure Ps is applied in the axial direction of the main valve body 51 and a force which is applied to the main valve body 51 in the axial direction is substantially canceled out by the control pressure Pc, and thus the control accuracy of the capacity control valve V is good.

In addition, in the normal control where the main valve 50 is closed, since there is no difference in pressure between the main valve chamber 20 and the back pressure chamber 30 which interpose the gap portion 90 therebetween, and there is no movement of the fluid through the gap portion 90, the probability of occurrence of an operational malfunction of the main valve body 51 due to foreign matter in the fluid penetrating into the gap portion 90 is lowered, and it is possible to improve the robustness of the capacity control valve V to foreign matter. Incidentally, the radial dimension of the gap portion 90 may be freely set by adjusting a radial separation dimension between the guide surface 10b of the valve housing 10 and the outer peripheral surface 51b of the main valve body 51.

In addition, since the intermediate communication passage 54 is formed inside the main valve body 51 and the pressure-sensitive valve body 52, it is possible to secure a wide flow path cross-sectional area inside the valve housing 10 of the capacity control valve V; and thereby, it is possible to rapidly lower the control pressure Pc in the control chamber of the variable displacement compressor when the pressure-sensitive valve 53 is opened.

Second Embodiment

Figure 4:
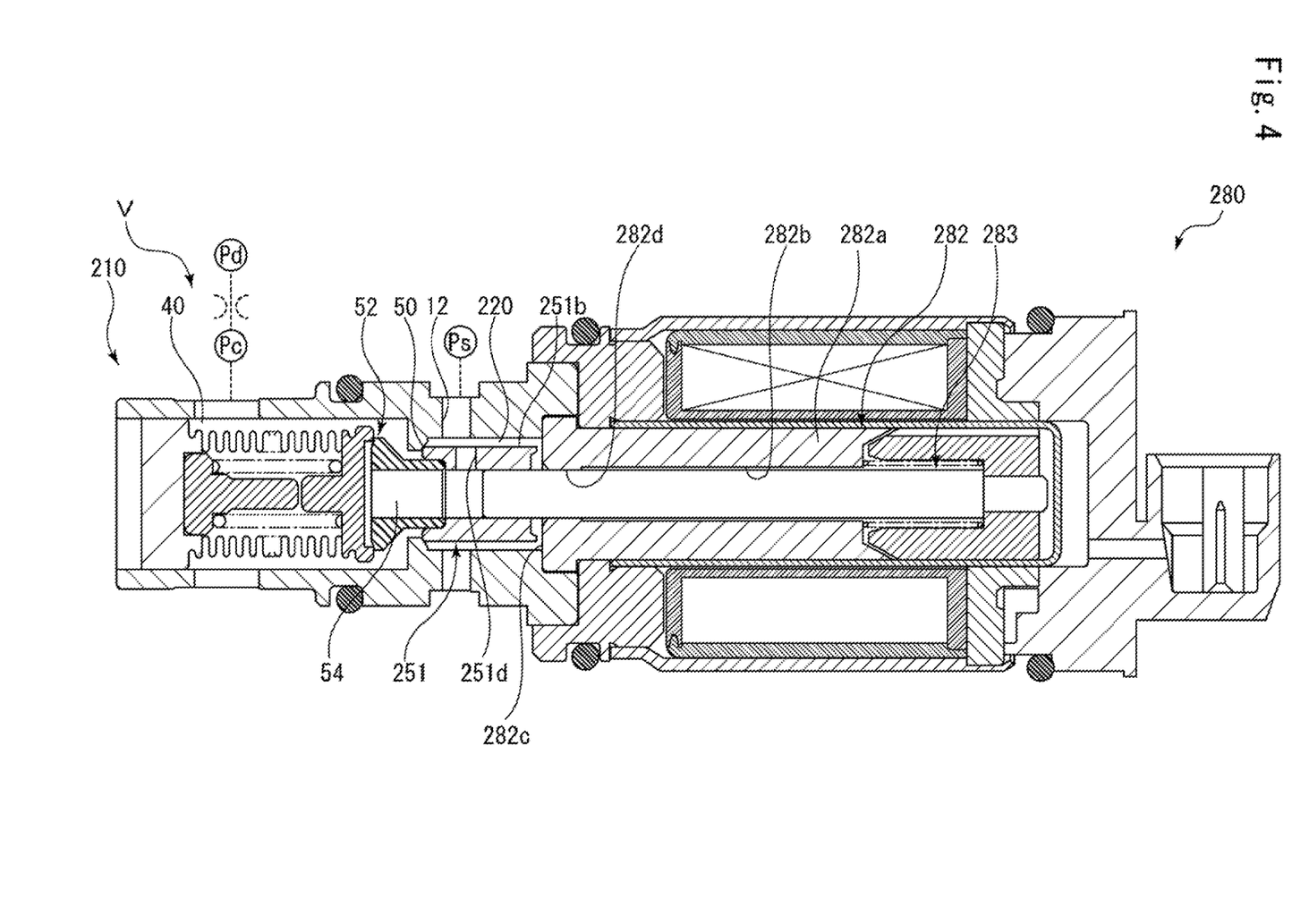
FIG. 4 is a cross-sectional view illustrating a mode where a main valve is closed when a capacity control valve according to a second example of the present invention is in an energizing state.

Subsequently, a capacity control valve according to a second embodiment of the present invention will be described with reference to FIG. 4. Incidentally, the same reference signs are assigned to the same components as the components described in the foregoing embodiment, and repeated descriptions will be omitted.

The capacity control valve V according to the second embodiment of the present invention will be described. As illustrated in FIG. 4, a fixed core 282 forming a solenoid 280 includes a cylindrical portion 282a where an insertion hole 282b into which a drive rod 283 which is a rod extending in the axial direction is inserted is formed. A guide surface 282d is annularly formed in a left axial end portion of the cylindrical portion 282a to protrude from an inner peripheral surface of the insertion hole 282b toward inside in the radial direction. Incidentally, the drive rod 283 is formed solid. A gap is formed between an outer peripheral surface of the drive rod 283 and the guide surface 282d of the fixed core 282, so that the outer peripheral surface and the guide surface 282d are slightly separated from each other in the radial direction. The drive rod 283 receives the driving force of the solenoid 280 to be able to move smoothly while being guided in the axial direction.

A main valve body 251 and the pressure-sensitive valve body 52 are disposed inside a valve housing 210 to be able to reciprocate in the axial direction. In addition, a main valve chamber 220 in which the main valve body 251 is disposed and a gap portion is formed, and the pressure-sensitive chamber 40 which is formed opposite to the main valve chamber 220 with respect to the main valve 50 in the axial direction are formed inside the valve housing 210. Incidentally, the main valve chamber 220 is defined by an opening end surface 282c of the fixed core 282, an outer peripheral surface 251b of the main valve body 251, and an inner peripheral surface of the valve housing 210, and extends to the back pressure side of the main valve body 251. In addition, a radial distance between the inner peripheral surface of the valve housing 210 and the outer peripheral surface 251b of the main valve body 251, the inner peripheral surface and the outer peripheral surface forming the main valve chamber 220, is larger than the radial distance of the gap formed between the outer peripheral surface of the drive rod 283 and the guide surface 282d of the fixed core 282.

The main valve body 251 has a substantially cylindrical shape. The pressure-sensitive valve body 52 having a substantially cylindrical shape is connected and fixed to a left axial end portion of the main valve body 251 which is one end of the main valve body 251, and the drive rod 283 is connected and fixed to a right axial end portion which is the other end. The main valve body 251, the pressure-sensitive valve body 52, and the drive rod 283 move integrally in the axial direction. In addition, a through-hole 251d extending in the radial direction is formed in the main valve body 251 on a side of the pressure-sensitive valve body 52 with respect to a left axial end of the drive rod 283. Incidentally, the through-hole 251d communicates with the intermediate communication passage 54 that is formed inside the main valve body 251 and the pressure-sensitive valve body 52, and communicates with the main valve chamber 220 of the valve housing 210.

Accordingly, in the normal control where the main valve 50 is closed, since the fluid is supplied through the communication passage 12 from the suction chamber to the gap portion of the main valve chamber 220 which is formed between the inner peripheral surface of the valve housing 210 and the outer peripheral surface 251b of the main valve body 251, there is almost no leakage of the fluid from the control chamber side toward the suction chamber side; and thereby, it is possible to widen the control range of the control pressure Pc by the capacity control valve V, and it is possible to improve the responsiveness and the cooling efficiency of the air conditioning system by the capacity control valve V.

In addition, since it is possible to move the main valve body 251 and the pressure-sensitive valve body 52 in the axial direction in a state where the axial movement of the drive rod 283 is guided by the guide surface 282d of the fixed core 282, it is possible to increase the degree of freedom in designing the valve housing 210 and the main valve body 251 while maintaining the control accuracy of the capacity control valve V, and it is possible to widen the flow path cross-sectional area of the main valve chamber 220. Furthermore, since the main valve chamber 220 extends to the back pressure side of the main valve body 251, it is possible to simplify the structure of the capacity control valve V.

In addition, since the pressure-sensitive valve 53 is opened at a random set pressure, the control pressure Pc which is high in the pressure-sensitive chamber 40 can be rapidly released from the intermediate communication passage 54 toward the main valve chamber 220, which is formed on the back pressure side of the main valve body 251, through the through-hole 251d of the main valve body 251.

The embodiments of the present invention have been described above with reference to the drawings; however, a specific configuration is not limited to the examples, and the present invention also includes changes or additions which are made without departing from the scope of the present invention.

For example, in the first embodiment, a communication passage communicating with the back pressure chamber 30 in the radial direction may be formed between the back pressure side end portion 51c of the main valve body 51 and the opening end surface 82c of the fixed core 82 by providing a through-hole, a slit, or the like, which extends in the radial direction, in the back pressure side end portion 51c of the main valve body 51. In addition, the through-hole, the slit, or the like may be provided on a side of the fixed core 82.

In addition, in the first embodiment, a through-hole extending in the radial direction may be formed in the main valve body 51, and the intermediate communication passage 54 and the back pressure chamber 30 may communicate with each other through the through-hole. In this case, the drive rod 83 may be formed solid.

Figure 5:
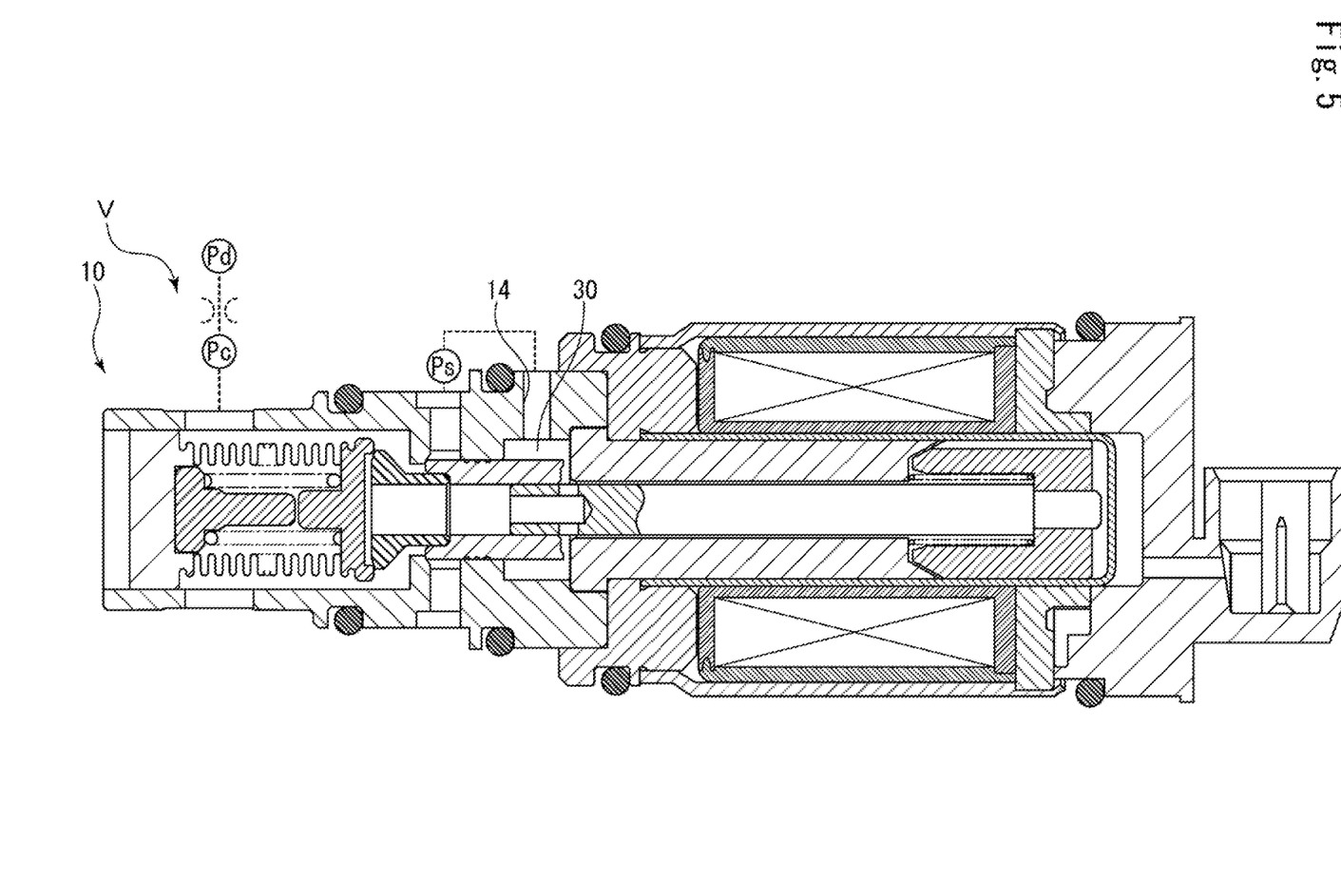
FIG. 5 is a cross-sectional view illustrating the configuration of a modification example of the capacity control valve according to the first embodiment.

In addition, as a modification example of the capacity control valve V in the first embodiment, as illustrated in FIG. 5, the gap portion 90 may become narrow in the radial direction by forming a communication passage 14 in the valve housing 10, the back pressure chamber 30 communicating with the suction chamber of the variable displacement compressor through the communication passage 14, and forming a flow path for supplying the fluid of the suction chamber to the back pressure chamber 30.

In addition, in the second embodiment, the configuration where the axial movement of the drive rod 283 is guided by the guide surface 282d of the fixed core 282 has been described; however, the present invention is not limited to the configuration, and the movable core forming the solenoid 280 may be guided by a guide surface. Furthermore, both of the drive rod 283 and the movable core may be guided.

Figure 6:
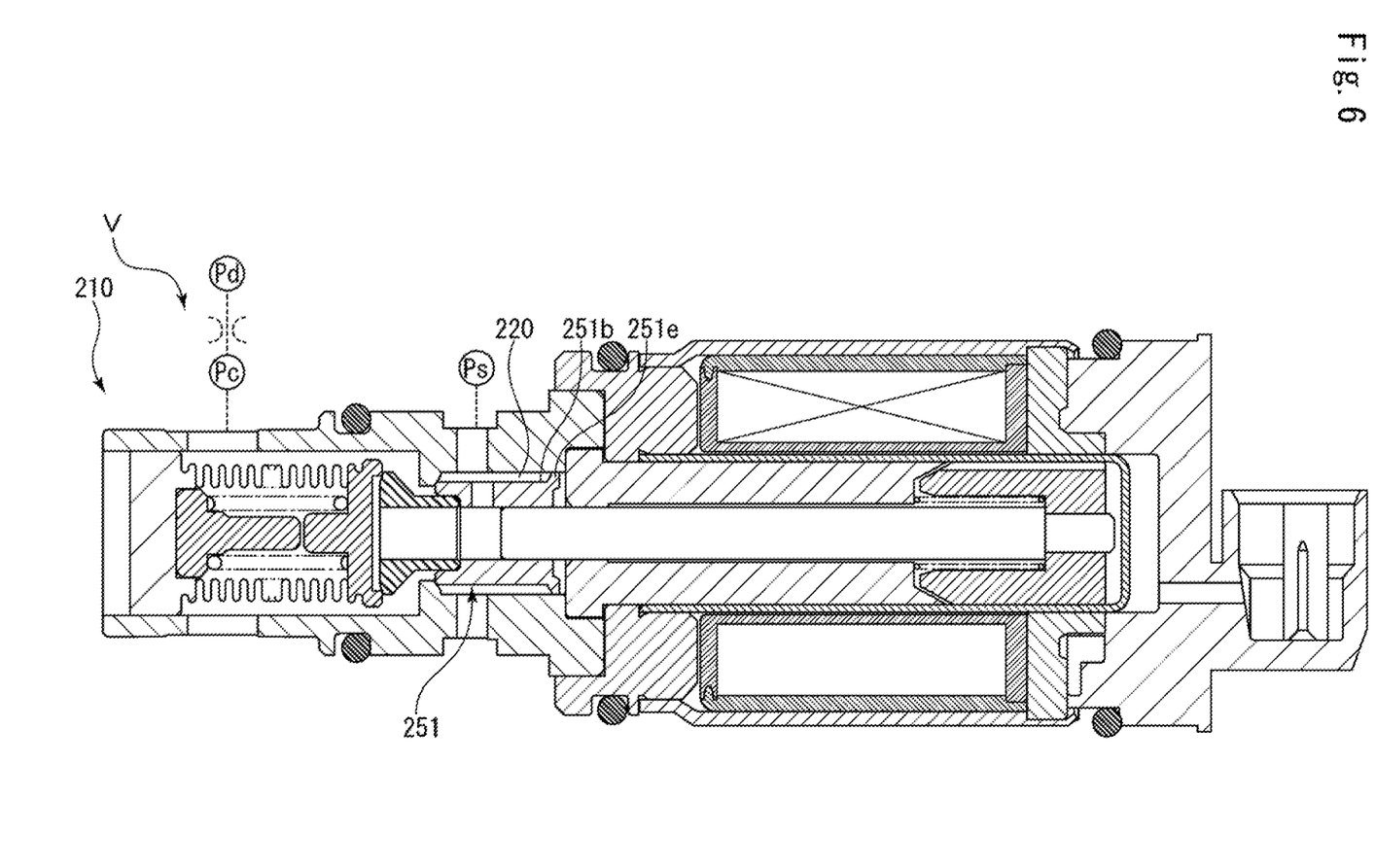
FIG. 6 is a cross-sectional view illustrating the configuration of a modification example of the capacity control valve according to the second embodiment.

In addition, as a modification example of the capacity control valve V in the second embodiment, as illustrated in FIG. 6, the inclination of the main valve body 251 may be prevented by forming a plurality of protrusion portions 251e, which protrude toward outside in the radial direction, on the outer peripheral surface 251b on the back pressure side of the main valve body 251, and by configuring the protrusion portions 251e so that the protrusion portions 251e can be in contact with the inner peripheral surface of the valve housing 210, the inner peripheral surface forming the main valve chamber 220. Incidentally, the number, the shapes, and the axial disposal positions of the protrusion portions 251e may not matter. Furthermore, the protrusion portions 251e may not be provided in the main valve body but be provided on the inner peripheral surface of the valve housing 210.

In addition, the pressure-sensitive body 60 may be one in which a coil spring is not used.

REFERENCE SIGNS LIST

10 Valve housing
10a Main valve seat
10b Guide surface
12 Communication passage (suction port)
13 Communication passage (control port)
20 Main valve chamber
30 Back pressure chamber
40 Pressure-sensitive chamber
50 Main valve
51 Main valve body
51a Main valve portion
51b Outer peripheral surface
52 Pressure-sensitive valve body
52a Pressure-sensitive valve portion
53 Pressure-sensitive valve
54 Intermediate communication passage (hollow hole)
60 Pressure-sensitive body
70 Adapter
70a Valve seat
70b Recess portion
80 Solenoid
81 Casing
82 Fixed core
83 Drive rod (rod)
83a Communication hole
83b Through-hole
84 Movable core
85 Coil spring
86 Coil
90 Gap portion
210 Valve housing
220 Main valve chamber (gap portion)
251 Main valve body
251b Outer peripheral surface
251d Through-hole
280 Solenoid
282 Fixed core
282d Guide surface
283 Drive rod (rod)
Pc Control pressure
Pd Discharge pressure
Ps Suction pressure
V Capacity control valve

The invention claimed is:

1. A capacity control valve comprising:
a valve housing provided with a main valve seat;
a main valve body that is inserted into the valve housing and includes a main valve portion which is configured to seat on the main valve seat to open and close a communication between a suction port and a control port using a driving force of a solenoid; and
a pressure-sensitive body configured to apply a biasing force to the main valve body in an opening direction according to pressure of a fluid surrounding the pressure-sensitive body,
wherein the fluid is supplied from the control port to around the pressure-sensitive body, and the fluid is supplied from the suction port to a back pressure side of the main valve body, and
the main valve body is provided with a pressure-sensitive valve body that is configured to seat on a pressure-sensitive valve seat formed on the pressure-sensitive body, and the main valve body and the pressure-sensitive valve body cooperatively have a hollow hole which extends in an axial direction thereof and which communicates with the back pressure side of the main valve body.

2. The capacity control valve according to claim 1, wherein the fluid from the suction port is supplied to the back pressure side of the main valve body through a gap portion between an inner periphery of the valve housing and an outer periphery of the main valve body.

3. The capacity control valve according to claim 2, wherein a recess portion having a larger diameter than that of the hollow hole of the main valve body is formed in the pressure-sensitive body and positioned on an inner diameter side with respect to the pressure-sensitive valve seat.

4. The capacity control valve according to claim 1, wherein a recess portion having a larger diameter than that of the hollow hole of the main valve body is formed in the pressure-sensitive body and positioned on an inner diameter side with respect to the pressure-sensitive valve seat.

5. The capacity control valve according to claim 4, wherein the main valve body has a cylindrical shape, the pressure-sensitive valve body is connected and fixed to a first end of the main valve body, a rod is connected and fixed to a second end the main valve body, and a through-hole extending in a radial direction is formed in the main valve body on a side of the pressure-sensitive valve body side with respect to the rod.

6. The capacity control valve according to claim 1, wherein the main valve body has a cylindrical shape, the pressure-sensitive valve body is connected and fixed to a first end of the main valve body, a rod is connected and fixed to a second end the main valve body, and a through-hole extending in a radial direction is formed in the main valve body on a side of the pressure-sensitive valve body side with respect to the rod.

7. The capacity control valve according to claim 3, wherein the main valve body has a cylindrical shape, the pressure-sensitive valve body is connected and fixed to a first end of the main valve body, a rod is connected and fixed to a second end the main valve body, and a through-hole extending in a radial direction is formed in the main valve body on a side of the pressure-sensitive valve body side with respect to the rod.

8. The capacity control valve according to claim 5, wherein the main valve body has a cylindrical shape, the pressure-sensitive valve body is connected and fixed to a first end of the main valve body, a rod is connected and fixed to a second end the main valve body, and a through-hole extending in a radial direction is formed in the main valve body on a side of the pressure-sensitive valve body side with respect to the rod.

* * * * *